United States Patent [19]

Nelson

[11] 4,321,983

[45] Mar. 30, 1982

[54] CLIMBING APPARATUS

[76] Inventor: Charles W. Nelson, 19 Cane Bend Dr., Haughton, La. 71037

[21] Appl. No.: 117,110

[22] Filed: Jan. 31, 1980

[51] Int. Cl.³ ..................... A01M 31/02; A45F 3/26; A47C 9/10

[52] U.S. Cl. .................................. 182/136; 182/135; 182/188

[58] Field of Search ............... 182/134, 135, 133, 187, 182/188

[56] References Cited

U.S. PATENT DOCUMENTS

| | | | |
|---|---|---|---|
| 1,098,945 | 6/1914 | Frederick | 182/187 |
| 2,982,337 | 5/1961 | Arena | 182/187 |
| 3,338,332 | 8/1967 | Brantly | 182/187 |
| 3,485,320 | 12/1969 | Jones | 182/187 |
| 3,944,022 | 3/1976 | Ming | 182/135 |
| 4,022,292 | 5/1977 | Gompel | 182/187 |
| 4,134,474 | 1/1979 | Stavenau | 182/187 |
| 4,137,995 | 2/1979 | Fonte | 182/135 |
| 4,168,765 | 9/1979 | Ferguson | 182/135 |

FOREIGN PATENT DOCUMENTS

| | | | |
|---|---|---|---|
| 67262 | 4/1892 | Fed. Rep. of Germany | 182/188 |
| 537424 | 11/1931 | Fed. Rep. of Germany | 182/133 |

*Primary Examiner*—Reinaldo P. Machado

[57] ABSTRACT

A climbing apparatus which is primarily used as a climbing deer stand, and which includes a pair of side frame members spaced by and mounted to a wedge support, and further provided with a wedge attached to the wedge support for engaging one side of a tree or pole, and an engaging bar removably carried by the side frames for encircling and engaging the opposite side of the tree or pole to support the apparatus. The climbing apparatus is used in cooperation with a foot support which is generally characterized by a pair of side supports shaped from a single piece of pipe or conduit into a generally U-shaped configuration, with a removable forward brace positioned between the terminus of the legs of the U, and a V-shaped rear brace spaced from the forward brace. The climbing apparatus is used to ascend a tree, post or pole by initially positioning the foot support in engagement with the tree and subsequently positioning the engaging bar of the climbing apparatus around the tree and above the foot support in cooperation with the side frames and wedge support, and first using the foot support as a brace to lift the climbing apparatus, and subsequently using the climbing apparatus as a brace to lift the foot support.

19 Claims, 12 Drawing Figures

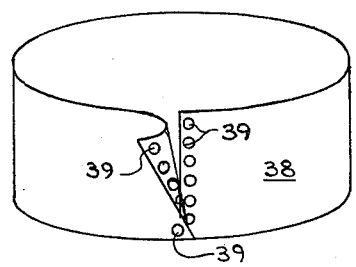
FIG. 6
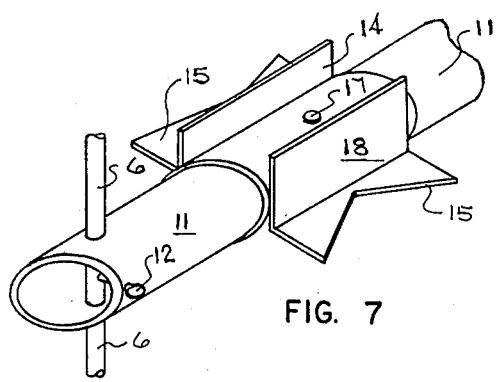
FIG. 7
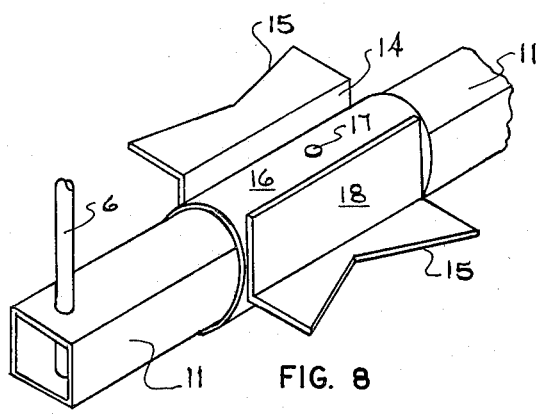
FIG. 8
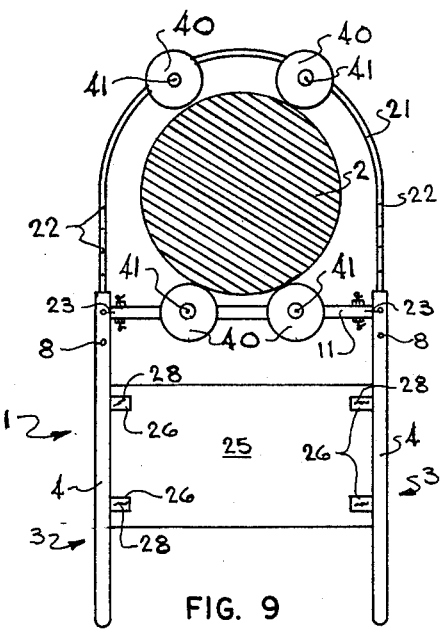
FIG. 9
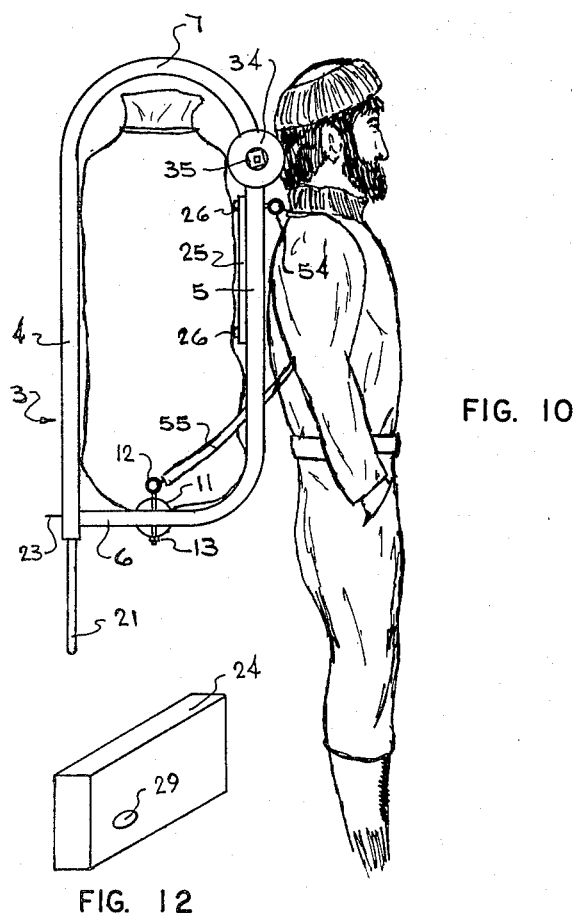
FIG. 10
FIG. 12
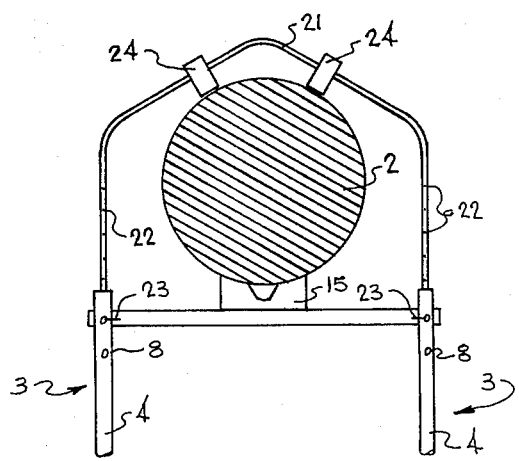
FIG. 11

CLIMBING APPARATUS

BACKGROUND OF THE INVENTION

1. Field of the Invention

This invention relates to an apparatus for ascending and descending trees, utility poles and other vertically positioned posts, and more particularly, to a portable climbing apparatus and a cooperating foot support, both of which are positioned circumferentially on a tree or pole with the climbing apparatus located above the foot support, and the user alternately standing on the foot support and lifting the climbing apparatus, and then sitting on the climbing apparatus to lift the foot support in order to work his way up the tree or pole. Both the climbing apparatus and the foot support are fitted with removable frame members for engagement and disengagement with the tree or pole in order to provide adjustment for the size of the tree or pole and to facilitate ease of manipulation. In a preferred embodiment of the invention, the foot support is connected to the climbing apparatus by a pair of safety straps to permit retrieval of the foot support should it inadvertently slip from engagement with the user's feet during climbing and descending. The climbing apparatus and foot support of this invention are light in weight and easy to manipulate, and the climbing apparatus can be provided with wheels for additional ease in transportation, as well as positioned in backpack fashion on the user's shoulders.

2. Description of the Prior Art

Various tree and pole climbing apparatus, and in particular, climbing deer stands and gun platforms, are known in the prior art. Typical of these platforms is the apparatus known as "The Rifleman" which is advertised in *Bow and Arrow* magazine in a feature known as the "Bow Hunter's Annual" on June 9, 1977, at page 66. This apparatus utilizes a climbing means and a cooperating foot support which appear to be light in weight and fairly easy to manipulate.

Also typical of the climbing apparatus known in the prior art is the hand climber for use with a tree climbing platform, as disclosed in U.S. Pat. No. 4,168,765 to Clarence E. Ferguson, et al. This climbing apparatus includes a hand climber which is attached to the tree above the user and is used in cooperation with a support platform carried by the user's feet, with the user pulling himself and the support platform up the tree or pole while grasping the hand climber, and subsequently supporting himself on the platform while manipulating the hand climber higher up the tree or pole. A similar pole climbing apparatus is illustrated in U.S. Pat. No. 4,137,995 to Frank Fonte, which apparatus includes a pair of platforms, one of which supports the feet of a user and the other positioned essentially about the waist of the user, and both of which engage the tree or pole to be climbed. The upper platform is initially used to support the weight of the user while the lower platform is pulled upwardly by the legs. Subsequently, the upper platform is pulled upwardly while the user's weight is supported by the lower platform to facilitate a means for moving up and down the pole or tree.

Yet another climbing apparatus is illustrated in U.S. Pat. No. 3,944,022 to Joseph W. Ming. The Ming tree climbing stand is built of rigid sheet material and includes a pair of tubular runners secured to either side of the stand and having a tree-contacting end fitted with a V-notch in the center. As in the case of the Ferguson stand, the climbing platform is fitted with a means for inserting the feet, and climbing is accomplished by grasping the tree, pulling the platform upwardly with the legs, and subsequently using the platform to support the legs while the user facilitates another grip higher up the tree. Descent is accomplished by reversing this climbing procedure.

Yet another climbing platform is illustrated in U.S. Pat. No. 3,338,332 to H. W. Brantly. The deer stand of this invention includes a U-shaped bracing element constructed in such a manner as to have its concave inner surface rest against the front of a tree; a clamping bar connectible to the legs of the U-shaped bracing element at the rear of the tree; a platform supported by the U-shaped bracing element and clamping bar; and braces extending downwardly at an angle from the platform which engage the trunk of the tree at a point below the U-shaped bracing element.

Many of the prior art clamping platforms, and portable climbing deer stands in particular, suffer from the disability of being relatively complicated and sometimes heavy, which are severe disadvantages to the deer hunter, who must depend upon mobility in order to assure access to the areas frequented by deer. Furthermore, some of the prior art devices, while light in weight, are not structurally sound and sufficiently large for relative positioning of the hunter, and do not include sufficient safety features for the average hunter.

Accordingly, it is an object of this invention to provide a new and improved climbing apparatus and cooperating foot support which are characterized by a high degree of safety, ease of manipulation and transportation, and facilitate great comfort and multiple position capability for the user when in position on a tree or pole.

Another object of this invention is to provide a new and improved portable climbing deer stand which can be quickly and easily transported to a desired hunting area and removably attached to a tree, and which is safe and easy to use in ascending and descending the tree and rotating or changing sitting position on the tree or pole.

A still further object of this invention is to provide a new and improved portable climbing apparatus which includes a pair of side frames spaced by a wedge support carrying a wedge for engagement with a tree or pole, and an engaging bar which may be removed from the side frames and positioned around the tree with the desired degree of slack or space, and removably secured to the side frames, typically by means of pins, for engagement with the tree in cooperation with the wedge.

Another object of this invention is to provide a new and improved climbing apparatus having a cooperating foot support or foot climber means, which foot support means is characterized by a generally U-shaped frame having a removable forward brace engagable with the legs of the U, and further fitted with teeth to securely engage a tree trunk or pole, and a rear brace mounted in angular relationship with respect to the frame and also fitted with teeth for cooperative engagement with the opposite side of the tree trunk or pole to provide a safe and firm footing for varying the position of the climbing apparatus during ascent and descent of a tree or pole.

Yet another object of this invention is to provide a new and improved climbing apparatus and cooperating foot support, which further includes one or more engaging blocks, rings or rollers to adjust the attitude of the apparatus at substantially any point on the tree trunk or pole regardless of the height of the tree or pole.

Another object of this invention is to provide a climbing apparatus and cooperating foot support, which apparatus is characterized by an adjustable wedge for selective engagement with the tree trunk, to facilitate adjustment in the attitude of the climbing apparatus and minimize damage to the tree during the ascent and descent of the apparatus.

Yet another object of this invention is to provide a climbing apparatus and cooperating foot support which can be collectively folded and stored as desired, and which may be fitted with wheels or provided with straps for backpacking as desired, in order to facilitate ease of transportation.

A further object of this invention is to provide a new and improved climbing apparatus and cooperating foot support which can be used as a sled to remove deer and other game animals from the woods, or to facilitate the movement of equipment and supplies from one point to the other, particularly over ice and snow.

Another object of the invention is to provide a climbing apparatus and foot support which cooperate to facilitate multiple selected sitting and standing positions, both facing the tree or pole and facing away from the tree or pole, and providing a foot rest for many of the sitting positions.

SUMMARY OF THE INVENTION

These and other objects of the invention are provided in a climbing apparatus and cooperating foot support which include the following elements:

(1) a pair of side frames, each shaped from a single piece of tubing or conduit to form a top horizontal member and a bottom horizontal member which is substantially parallel to the top member, and forming a front vertical member and a rear verticle member, also disposed in essentially parallel relationship to each other. The side frames are spaced by a wedge support carrying a shallow or deep wedge, or both, as desired, for engagement with a tree or pole to facilitate ascent and descent on the tree or pole;

(2) An engaging bar removably and adjustably fitted to the side frames and adapted to encircle the tree and mount the climbing apparatus on the tree or pole when the engaging bar and the wedge are in contact with the tree or pole on opposite sides of the tree or pole; and (3) A foot support characterized by a generally U-shaped frame and having a removable forward brace and a V-shaped rear brace, and adapted to engage the tree or pole in the same manner as the climbing apparatus and positioned beneath the climbing apparatus to initially provide a support for the user while the climbing apparatus is being lifted, and which may be subsequently lifted upwardly by the user's legs when the climbing apparatus is extended upwardly and anchored on the tree by the user's weight.

BRIEF DESCRIPTION OF THE DRAWINGS

The invention will be better understood in view of the following description presented with reference to the accompanying drawings, wherein:

FIG. 6 is a perspective view of an optional flexible seat which can be used in cooperation with the climbing apparatus;

FIG. 7 is a perspective view, partially in section, of a preferred embodiment of a double wedge system used in the climbing apparatus;

FIG. 8 is a perspective view, partially in section, of an alternative preferred embodiment of the wedge used in the climbing apparatus;

FIG. 9 is a top elevation of an alternative embodiment of the climbing apparatus shown in position on a tree;

FIG. 10 is a side elevation of the climbing apparatus in position as a backpack strapped to a user;

FIG. 11 is a top elevation of yet another preferred embodiment of the climbing apparatus with levelling blocks attached to a tree; and FIG. 12 is a perspective view of a levelling block used to adjust the attitude of the climbing apparatus when in functional position.

DESCRIPTION OF THE PREFERRED EMBODIMENTS

Figure 1:
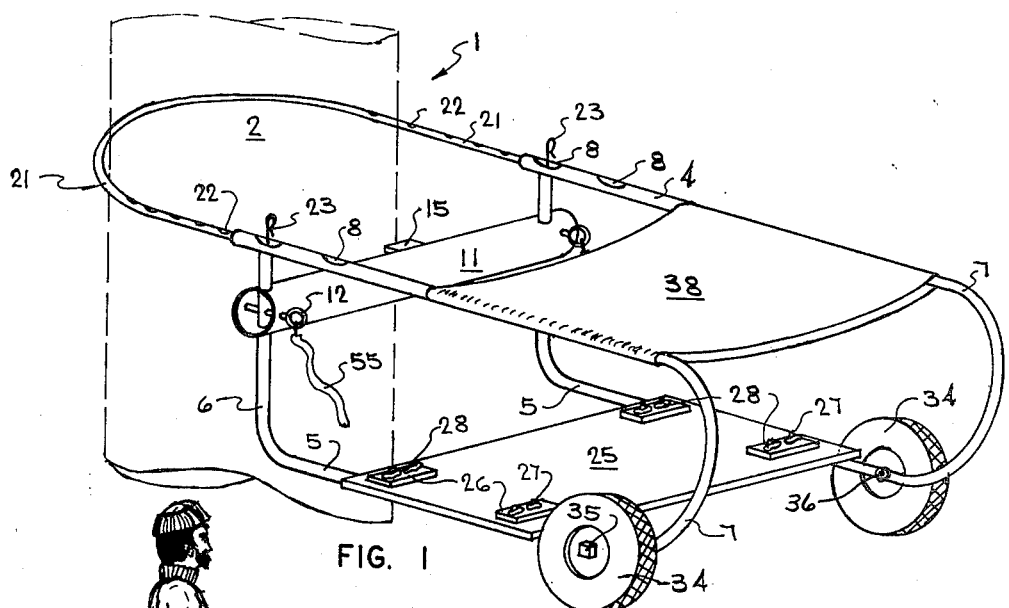
FIG. 1 of the drawings is a perspective view of the climbing apparatus in functional position on the trunk of a tree.
Figure 2:
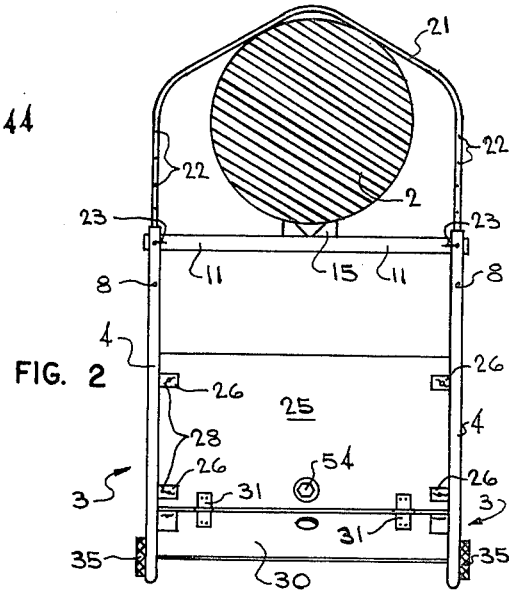
FIG. 2 is a top view of the climbing apparatus illustrated in FIG. 1.

Referring now to FIGS. 1 and 2 of the drawings, the climbing apparatus of this invention is generally illustrated by reference numeral 1 and is illustrated in FIG. 1 in functional position on a tree or pole 2. Climbing apparatus 1 is characterized by a pair of spaced side frames 3, which in a preferred embodiment are formed from a single piece of round steel tubing to form top horizontal members 4, bottom horizontal members 5 which are generally parallel to and spaced from top horizontal members 4, respectively, and front vertical members 6, spaced from and generally parallel to oppositely disposed rear vertical members 7. Side frames 3 are spaced by a wedge support 11, which in a preferred embodiment is generally tubular in construction and is slidably fitted to front vertical members 6 of side frames 3 by means of wedge support eye bolts 12 and wedge support eye bolt nuts 13, positioned in the registering apertures in wedge support 11 and front vertical members 6, as illustrated. Wedge support 11 carries a shallow wedge 14, having an outwardly projecting wedge blade 15 for engagement with one side of the tree or pole, as illustrated.

Climbing apparatus 1 is also fitted with a removable engaging bar 21 which is adapted to partially encircle the tree or pole 2 and engage the opposite side of the tree or pole from the shallow wedge 14 to secure the climbing apparatus in position. Engaging bar 21 is fitted with a plurality of engaging bar apertures 22 and is designed to fit concentrically inside top horizontal members 4, with selected ones of engaging bar apertures 22 in sequential registration with one of a pair of frame apertures 8, provided in top horizontal members 4. In this manner climbing apparatus 1 can be adjustably and removably mounted on substantially any tree, pole or post by adjusting engaging bar 21 in top horizontal members 4 and positioning engaging pins 23 in the appropriate ones of frame apertures 8 and registering engaging bar apertures 22 to facilitate a generally horizontal positioning climbing apparatus 1 on tree or pole 2.

A rigid seat 25 is removably and adjustably attached to bottom horizontal members 5 of side frames 3 by means of bracket plates 26, U-brackets 27 and wing nuts 28. In this manner rigid seat 25 may be adjustably positioned on bottom horizontal member 5 in order to provide sufficient space between wedge support 11 and the forward edge of rigid seat 25 to permit access by a user and a comfortable seat on rigid seat 25, as hereinafter described. Similarly, a flexible seat 38, more particularly illustrated in FIG. 6 of the drawings, may be provided on top horizontal members 4 as illustrated in FIG. 1 of the drawings, in order to facilitate additional seating positions as further hereinafter described. Flexible seat 38 is removably positioned on top horizontal members 4 by means of seat fasteners 39, as illustrated in FIG. 6. It will be appreciated that in a preferred embodiment of the invention flexible seat 38 can be fitted to top horizontal members 4 with sufficient slack to permit the seat to be slid rearwardly onto rear vertical members 7 of side frames 3 to provide a backrest for a user while sitting on rigid seat 25 and facing tree or pole 2. Alternatively, flexible seat 38 can be positioned on top horizontal members 4 as illustrated in FIG. 1 and the user may sit in conventional fashion on the seat, either facing the tree or pole 2, or facing away from the tree or pole, with the feet resting on rigid seat 25, as desired. Further in the alternative and referring again to FIG. 2 of the drawing, a back support 30 can be provided in hinged relationship to rigid seat 25 with hinges 31 serving to foldably secure back support 30 to rigid seat 25 in the event that flexible seat 38 is not used in climbing apparatus 1. An additional function of back support 30 is that of acting as a skid plate when climbing apparatus 1 is towed through the woods over rough terrain, and over ice and snow, when back support 30 and rigid seat 25 are reversed on bottom horizontal member 5 with back support 30 facing front vertical members 6 and resting against wedge support 11. This embodiment is made possible by the preferred relatively shallow bend in side frames 3 where front vertical members 6 join bottom horizontal members 5, respectively, to form runners which are well adapted to fit climbing apparatus 1 as a sled. Accordingly, climbing apparatus 1 can be used with or without wheels 34, illustrated in FIG. 1, to remove deer and other animals from the woods with back support 30 in position as a skid plate. When it is desired to utilize wheels 34 in cooperation with climbing apparatus 1 to facilitate additional ease of transportation of the apparatus, wheels 34 may be provided in position as illustrated in FIG. 1 mounted on rear vertical members 7 by means of wheel bolts 35, and secured by wheel nuts 36.

Figure 4:
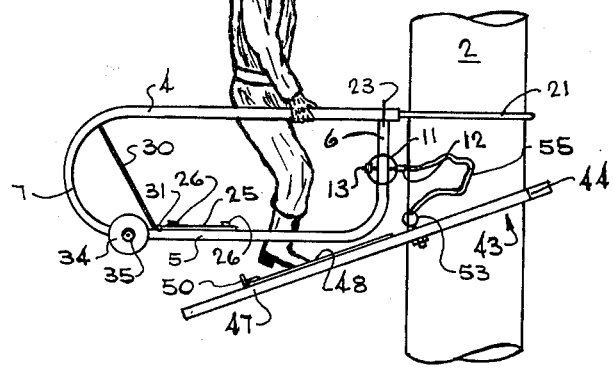
FIG. 4 is a side elevation of the climbing apparatus and the foot support in functional position with the climbing apparatus being lifted and the foot support used to momentarily support the user.
Figure 5:
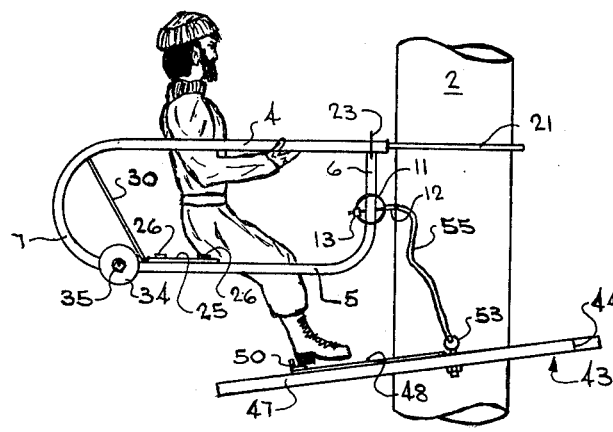
FIG. 5 is a side elevation of the climbing apparatus and the cooperating foot support, with the climbing apparatus used to momentarily support the user and the foot support being lifted upwardly by the user's legs.
Figure 3:
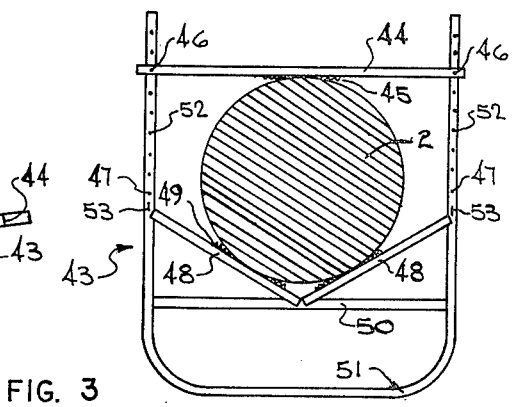
FIG. 3 is a top elevation of the foot support used in cooperation with the apparatus, also in engagement with the tree.

Referring now to FIGS. 3-5 of the drawings, it will be appreciated that ascending and descending a tree or pole by means of climbing apparatus 1 requires the use of a cooperating foot support 43, illustrated in functional position on tree or pole 2.

Referring specifically to FIG. 3 foot support 43 is characterized by a removable forward brace 44 which is secured in a selected position on side supports 47 by means of adjusting apertures 52 in side supports 47, and a pair of cooperating and registering apertures provided in forward brace 44, to accommodate foot support pins 46. Forward brace 44 may be provided with apertures (not illustrated) to slidably receive side supports 47. Foot support 43 is positioned immediately beneath climbing apparatus 1 on the tree or pole 2, with forward brace teeth 45 immediately adjacent one side of the tree or pole 2, and rear brace teeth 49, provided on rear brace 48, in contact with the tree or pole on the opposite side thereof. A foot rest 50 is provided adjacent rear brace 48 to both serve as a support member for rear brace 48 and to cooperate with rear frame member 51 in facilitating lifting of the foot support, as hereinafter described.

Referring now specifically to FIGS. 1, 4 and 5 of the drawings, when climbing apparatus 1 and foot support 43 are situated for use, it will be appreciated that climbing apparatus 1 is first positioned on a tree or pole 2 as illustrated in FIG. 1, and as heretofore described, foot support 43 is subsequently positioned on the tree or pole 2 immediately beneath climbing apparatus 1 with rear frame member 51 located on the same side of the tree or pole as climbing apparatus 1. A user, such as a hunter, utilizing climbing apparatus 1 then positions himself as illustrated in FIG. 4 with the feet firmly situated on rear frame member 51 and the toes tucked beneath foot rest 50, as illustrated. To ascend the tree, the user grasps both top horizontal members 4, and using foot support 43 as a support base, lifts climbing apparatus 1 upwardly as indicated by the arrow in FIG. 4, to a position higher on the tree or pole 2. When climbing apparatus 1 is in the desired elevated position, the hunter or user then seats himself on rigid seat 25, as illustrated in FIG. 5 of the drawing. The user's weight causes wedge blade 15 of shallow wedge 14 to engage and penetrate the bark of the tree and cooperate with the engaging bar 21 to support the user in the seated position, as illustrated. While in this position, the user can then lift foot support 43 as indicated by the bottom arrow in FIG. 5 to a point immediately beneath climbing apparatus 1. The process is then repeated in order to ascend the tree or pole 2 to a desired height. The process is reversed in order to descend the tree or pole. As further illustrated in FIGS. 4 and 5, in a preferred embodiment of the invention a pair of safety straps 55 are attached to the eye of wedge eye bolts 12 mounted on climbing apparatus 1, and to foot support eye bolts 53 positioned on foot support 43, respectively, in order to provide a means for retrieving foot support 43 in the event that it inadvertently slips off the feet of the user.

Referring now to FIGS. 7 and 8 of the drawings, in a preferred embodiment of the invention wedge support 11 may be provided with a wedge collar 16, which is concentrically and rotatably mounted on wedge support 11 and is secured in position by a wedge pin 17. Referring specifically to FIG. 7, a deep wedge 18 is mounted on one side of wedge collar 16, and is provided with a relatively deeply notched wedge blade 15, as illustrated. A shallow wedge 14 is also secured to wedge collar 16 at a point directly opposite deep wedge 18, and is provided with a relatively shallow wedge blade 15. It will be appreciated in this embodiment of the invention that both shallow wedge 14 and deep wedge 18 are mounted in upright relationship with the respective wedge blades 15 projecting in essentially the same plane on the bottom of shallow wedge 14 and deep wedge 18, respectively. Accordingly, when it is desired to use either respective wedge, wedge pin 17 can be removed from registering apertures in wedge support 11 and wedge collar 16, and wedge collar 16 can be rotated with respect to wedge support 11 to functionally position the desired wedge.

Referring now to FIG. 8 of the drawing, in yet another preferred embodiment of the invention wedge collar 16 is provided with a shallow wedge 14 and a deep wedge 18 having wedge blades 15 which project in different planes, respectively as illustrated. In this manner both shallow wedge 14 and deep wedge 18 are positioned in the same respective relationship when wedge pin 17 is removed and wedge collar 16 is rotated on wedge support 11 to locate each respective wedge blade 15 against the tree or pole 2, as illustrated in FIGS. 1 and 2. It will be further appreciated that in this embodiment of the invention wedge support 11 is illustrated as a structural member having a square cross-section rather than the round tubing illustrated in FIG. 7. In a most preferred embodiment of the invention, the wedge support 11 is formed of round tubing as illustrated in FIG. 7 and the wedge collar 16 is characterized by a shallow wedge 14 and a deep wedge 18, the wedge blades 15 of which project in different planes, as illustrated in FIG. 8. Selection of either deep wedge 18 or shallow wedge 14 can be made for application depending upon the type of tree to be climbed, since the bark of trees varies in texture and strength. Furthermore, a longer wedge can be utilized on wedge collar 16 to help adjust the altitude of climbing apparatus 1 after the apparatus reaches the smaller top area of a tree trunk.

Referring now to FIG. 9 of the drawing, in another preferred embodiment of the invention engaging bar 21 can be formed in a more arcuate configuration and may be provided with a pair of rollers 40 secured in rotatable relationship to engaging bar 21 by means of roller bolts 41 and cooperating nuts (not illustrated). Similarly, a pair of rollers 40 may also be mounted in rotatable relationship on wedge support 11 by means of roller bolts 41, to replace shallow wedge 14. As illustrated, the four rollers 40 are designed to engage the tree or pole 2 and secure climbing apparatus 1 in position in the same manner as the cooperating engaging bar 21 and shallow wedge 14. An advantage of the inventive embodiment illustrated in FIG. 9 is the facility of the user to position himself at any point on tree or pole 2 and achieve 360 degree movement around the periphery of the tree by simply thrusting with the feet against foot support 43 in a clockwise or counter-clockwise direction to position climbing apparatus 1 at a desired point on the tree or pole.

It will be appreciated by those skilled in the art that in addition to the transportation of climbing apparatus 1 as a dolly by means of wheels 34, as heretofore described, the apparatus can be strapped to the shoulders of the user, as illustrated in FIG. 10 of the drawings, and carried in "backpack" fashion. When climbing apparatus 1 is secured in this configuration foot support 43 can be positioned between top horizontal members 4, and the cavity defined by side frames 3 and rigid seat 25 can be used to carry supplies, including sleeping bags, tents, and the like.

Referring now to FIGS. 11 and 12 of the drawing, in yet another preferred embodiment of the invention, under circumstances where it is desired to level the climbing apparatus 1 to compensate for the reduced diameter of a tall tree, a pair of levelling blocks 24, each having a block aperture 29 therein, as is more particularly illustrated in FIG. 12 of the drawing, may be inserted on engaging bar 21 and used to block climbing apparatus 1 into a substantially horizontal position when a point of rest is reached on the tree. As illustrated in FIG. 12, block aperture 29 is provided in levelling blocks 24 at a point nearer one end of the blocks than the other end, in order to provide an adjustment for achieving more or less blocking, as necessary to achieve the desired attitude of climbing apparatus 1.

As illustrated in FIG. 8 of the drawings, and as described above, wedge support 11 can be formed of hollow, square stock, as desired. Furthermore, side frames 3, engaging bar 21, side supports 47, and rear frame member 51 can also be formed of stock having a square cross-section, or other polygonal cross-section, as desired. However, in a preferred embodiment of the invention side frames 3, engaging bar 21, side supports 47 and rear frame member 51 are formed of tubing, and in a most preferred embodiment, side frame 3 and side supports 47 and rear frame member 51 are formed of a single piece of hollow tubing, respectively. In another most preferred embodiment of the invention engaging bar 21 is shaped from a single piece of round solid metal, having a diameter sufficiently small to fit concentrically into the projecting, open ends of top horizontal members 4. Furthermore, the forward brace 44 and rear brace 48 are most preferably formed of angle iron to facilitate ease of manufacture, and forward brace teeth 45 and rear brace teeth 48 are either welded on forward brace 44 and rear brace 48, or filed and shaped in the braces, respectfully, as desired.

Referring again to FIG. 1, it will be appreciated that the climbing apparatus of this invention can be folded in one configuration for storage or transportation by removing wedge support eye bolts 12 from wedge support 11 and front vertical members 6, sliding wedge support 11 downwardly to bottom horizontal members 5, loosening wing nuts 28, and folding side frames 3 inwardly on rigid seat 25. Foot support 43 can then be stacked on side frames 3 and secured in place by safety straps 55. Alternatively, seat 25 can be removed, engaging bar 21 disengaged from top horizontal members 4, and wedge support eye bolts 12 removed to permit climbing apparatus 1 to be folded on front vertical members 6.

Referring again to FIG. 1 of the drawings, it will be further appreciated that eye bolts 12 can be reversed to position the eyes inwardly of the user, as desired, to permit safety straps 55 to hang farther from tree or pole 2, to avoid entanglement during climbing. Furthermore, in a preferred embodiment of the invention the two frame apertures 8, located in each of top horizontal members 4, are about 2 inches apart, and the engaging bar apertures are about 1 inch center-to-center. This spacing permits exact adjustment of engaging bar 21 around a tree or pole of substantially any diameter from about 4 inches to about 22 inches with a close tolerance for achieving horizontal mounting of climbing apparatus 1.

The climbing apparatus of this invention is characterized by a high degree of flexibility in mode of transportation, since it can be carried in a variety of ways. The apparatus can be hand-carried by fitting the engaging bar over one shoulder, or it can be carried in "backpack" fashion, using safety straps 55, as illustrated in FIG. 10. Furthermore, when fitted with wheels 34, the apparatus can be grasped by the engaging bar and wheeled through the woods like a dolly or cart. Similarly, the engaging bar can be attached to a motorcycle or motorcycle 3-wheel vehicle and pulled to the hunting site. Also, since the side frames are curved at the juncture of bottom horizontal members 5 and front vertical members 6, the apparatus can be towed as a sled, both on the ground and on snow and ice, particularly where the relative positions of rigid seat 25 and back support 30 are reversed, to use back support 30 as a skid plate. In areas characterized by heavy snowfall, the climbing apparatus can be easily towed by a snowmobile.

Referring to FIG. 1 of the drawings, it will be further appreciated that multiple seating and standing positions are possible when the apparatus or stand is in functional position on a tree or pole, the user can be seated on the rigid seat 25 facing the tree, either with the flexible seat 38 removed or with it adjusted to position on rear vertical members 7, as a back rest. If flexible seat 38 is removed, back support 30 can be rotated on back support hinges 31 to rest against rear vertical members 7, as a back support. When back support 30 is in position flat against rigid seat 25, the user can seat himself on rigid seat 25 facing outwardly of the tree or pole, and regardless of the position of back support 30, he can be seated facing outwardly of both sides of side frames 3, and he can stand on rigid seat 25. Furthermore, when flexible seat 38 is in place, the user or hunter can be seated on the flexible seat facing substantially any direction in a 360 degree range, with or without the feet supported on rigid seat 25. When standing, a hunter can either stand on rigid seat 25 or on foot support 43, as desired.

Referring again to FIG. 3 of the drawings, as heretofore noted, forward brace 44 and rear brace 48 are, in a preferred embodiment, formed of angle iron with the top flange of the angle iron member projecting inwardly and provided with teeth for secure engagement with the tree or pole 2. Rear brace 48 is preferably formed of a single piece of angle iron, the top flange of which is cut, and the downwardly projecting flange bent to position the brace as illustrated.

It will also be appreciated by those skilled in the art that the climbing apparatus of this invention is quite safe, as well as comfortable. The presence of top horizontal members 4 on each side of rigid seat 25, and the back support 30 make it difficult for any user to fall from the apparatus while seated on rigid seat 25 facing the tree or pole. Furthermore, when the user is seated on the flexible seat 38 in position facing away from the tree or pole, he can position the adjustable seat sufficiently close to the tree or pole to enable use of the tree or pole as a backrest for additional comfort and security.

Having described my invention with the particularity set forth above, what is claimed is:

1. A climbing apparatus comprising:
   (a) a pair of generally vertically oriented side frames disposed in spaced relationship, said side frames each shaped to form a top horizontal member; a bottom horizontal member in essentially parallel relationship to said top horizontal member; a front vertical member; and a rear vertical member in essentially parallel relationship to said front vertical member;
   (b) a wedge support slidably attached to said front vertical member of each of said side frames at the forward ends of said side frames;
   (c) at least one wedge secured to said wedge support and facing forward of said side frames;
   (d) a seat attached said bottom horizontal member of each of said side frames; and
   (e) a rounded engaging bar removably attached to said top horizontal member of each of said side frames and adapted to encircle and engage a tree when said wedge contacts said tree and weight is applied to said seat, and a first plurality of apertures provided in spaced relationship in said engaging bar and at least one second aperture in said top horizontal member of each of said side frames, and engaging pins for registering with selected ones of said first plurality of apertures and said at least one second aperture to removably secure said engaging bar to said top horizontal member on said side frames and position said wedge against the tree.

2. The climbing apparatus of claim 1 wherein said at least one wedge is a pair of wedges rotatably secured to said wedge support and oppositely disposed from each other.

3. The climbing apparatus of claim 1 wherein:
   (a) said side frames are each shaped from a single length of tubing;
   (b) said engaging bar is concentrically attached to said top horizontal member of each of said side frames and said seat is removably attached to said bottom horizontal member of each of said side frames; and
   (c) said at least one wedge is a pair of wedges rotatably secured to said wedge support and oppositely disposed from each other.

4. The climbing apparatus of claim 1 further comprising a foot support characterized by a generally U-shaped foot support frame having a pair of rear braces mounted in angular relationship to said frame and a removable forward brace adjustably carried by said frame and spaced from said rear braces for mounting said foot support on said tree beneath said climbing apparatus.

5. The climbing apparatus of claim 4 wherein said rear braces are provided with teeth for secure gripping of a tree and said foot support frame is provided with a plurality of adjusting apertures on each projecting leg thereof.

6. The climbing apparatus of claim 4 wherein said foot support frame is formed of metal tubing and said rear braces and said forward brace are formed of angle-iron.

7. The climbing apparatus of claim 5 wherein:
   (a) said rear braces are provided with teeth for secure gripping of a tree and said foot support frame is provided with a plurality of adjusting apertures on each projecting leg thereof; and
   (b) said foot support frame is formed of metal tubing and said rear braces and said forward brace are formed of angle-iron, and further comprising a pair of brace apertures in said forward brace for adjustable registration with said foot support frame, and a pair of foot support pins in registration with said adjusting apertures to removably position said forward brace on said foot support frame.

8. A foldable, portable climbing apparatus comprising:
   (a) a pair of generally vertically disposed side frames, each shaped to form a top horizontal member; a bottom horizontal member disposed in parallel relationship to said top horizontal member; a front vertical member; and a rear vertical member disposed in generally parallel relationship to said front vertical member;

(b) a wedge support slidably carried by said front vertical member of each of said side frames;

(c) at least one wedge having a notched wedge blade attached to said wedge support and facing forward of said side frames;

(d) a rigid seat removably attached to said bottom horizontal member of each of said side frames;

(e) a U-shaped engaging bar having projecting engaging bar legs and a first plurality of spaced apertures in said engaging bar legs, said engaging bar legs spaced for encircling a tree and adjustably cooperating with said top horizontal member of each of said side frames, and in co-support of said climbing apparatus with said at least one wedge; and (f) a foot support characterized by a U-shaped foot support frame having a pair of rear braces mounted in angular relationship to said foot support frame and a removable forward brace adjustably carried by said foot support frame and spaced from said rear braces for mounting said foot support on said tree beneath said climbing apparatus.

9. The climbing apparatus of claim 8 further comprising at least one safety strap having one end removably attached to at least one of said side frames and the opposite end attached to said foot support.

10. The climbing apparatus of claim 8 further comprising a rigid back support hingedly carried by said seat and selectively foldable against said rigid seat and against said rear vertical member of each of said side frames.

11. The climbing apparatus of claim 8 further comprising a flexible seat removably and slidably fitted to said top horizontal member of each of said side frames.

12. The climbing apparatus of claim 8 further comprising:
(a) a pair of straps, each having one end removably attached to one of said side frames, respectively, and the opposite ends attached to said foot support;
(b) a rigid back support hingedly carried by said seat and selectively foldable against said rigid seat and against said rear vertical member of each of said side frames; and
(c) a flexible seat removably and slidably fitted to said top horizontal member of each of said side frames.

13. The climbing apparatus of claim 8 further comprising at least one levelling block slidably carried by said engaging bar for adjusting the attitude of said climbing apparatus on said tree.

14. The climbing apparatus of claim 8 wherein said at least one wedge is a pair of oppositely-disposed wedges rotatably mounted on said wedge support for selective positioning against said tree, and further comprising a wedge pin cooperating with said wedge support and said wedges to secure a selected disposition of said wedges.

15. The climbing apparatus of claim 8 wherein said side frames are formed of a single length of metal tubing, said engaging bar is round, and said projecting legs of said engaging bar slidably and adjustably fit inside said top horizontal member of said side frames, respectively, to secure said climbing apparatus on said tree.

16. The climbing apparatus of claim 8 further comprising:
(a) a pair of safety straps, each having one end removably attached to one of said side frames, respectively, and the opposite ends attached to said foot support;
(b) a rigid back support hingedly carried by said seat and selectively foldably against said rigid seat and against said rear vertical member of each of said side frames; and
(c) a flexible seat removably and slidably fitted to said top horizontal member of each of said side frames, and wherein said side frames are formed of a single length of metal tubing, said engaging bar is round, and said projecting legs of said engaging bar slidably and adjustably fit inside said top horizontal member of said side frames, respectively, to secure said climbing apparatus on said tree.

17. The climbing apparatus of claim 8 further comprising a pair of wheels secured to said side frames for towing said climbing apparatus.

18. The climbing apparatus of claim 8 further comprising a plurality of wheels mounted on said engaging bar and said wedge support for engaging said tree and supporting said climbing apparatus.

19. The climbing apparatus of claim 13 wherein said at least one leveling block slidably carried by said engaging bar for levelling said climbing apparatus on said tree is a pair of levelling blocks.

* * * * *